United States Patent
Lachance

(10) Patent No.: US 7,404,565 B2
(45) Date of Patent: Jul. 29, 2008

(54) ANTI-ZIGZAG GUIDE RAIL FOR SNOWMOBILE SKI

(76) Inventor: Ghislain Lachance, 471, Rue des Cedres, St-Elzear de Beauce, Quebec (CA) G0S 2J0

( * ) Notice: Subject to any disclaimer, the term of this patent is extended or adjusted under 35 U.S.C. 154(b) by 0 days.

(21) Appl. No.: 11/705,116

(22) Filed: Feb. 12, 2007

(65) Prior Publication Data
US 2007/0182111 A1  Aug. 9, 2007

(51) Int. Cl.
*B62B 13/00* (2006.01)
(52) U.S. Cl. .................. 280/28; 280/11.18; 280/21.1; 280/609
(58) Field of Classification Search ............. 280/28, 280/11.18, 15, 21.1, 22, 22.1, 606, 608, 609
See application file for complete search history.

(56) References Cited

U.S. PATENT DOCUMENTS 3,857,578 A * 12/1974 Alton ..................... 280/28
6,267,392 B1 * 7/2001 Noble ..................... 280/28
7,017,695 B2 * 3/2006 Meunier et al. ......... 180/182
7,252,301 B2 * 8/2007 Valikangas .............. 280/609

FOREIGN PATENT DOCUMENTS

CA           2535532       *   2/2006

* cited by examiner

*Primary Examiner*—Christopher Ellis
*Assistant Examiner*—John D Walters

(57) ABSTRACT

A guide fixed at the front of a ski of a snow vehicle (22) and including two wings (40) of reversed U-Shape, whose web (60) is linked to the lower face of the ski, the guide including means of initialization (64) of a rectangular runner (48) which is laid out sideways, in continuation and in line with the guide. A ski of a snow vehicle used in combination with a wear runner which is laid out longitudinally of the ski, the bottom face of the ski having in its fore end a pair of downward wings (40) acting as knives and spaced to guide the snow on the two sides of the wear runner. The existing methods of stabilization of snow vehicle implying a sole carbide runner are improved by the presence of the guide, which guides the runner through the trails left by the passage of skis of other snow vehicles. The runner is further improved by a rectangular section thereof, which is laid out sideways and longitudinally of the ski and by its being self sharpening.

12 Claims, 6 Drawing Sheets

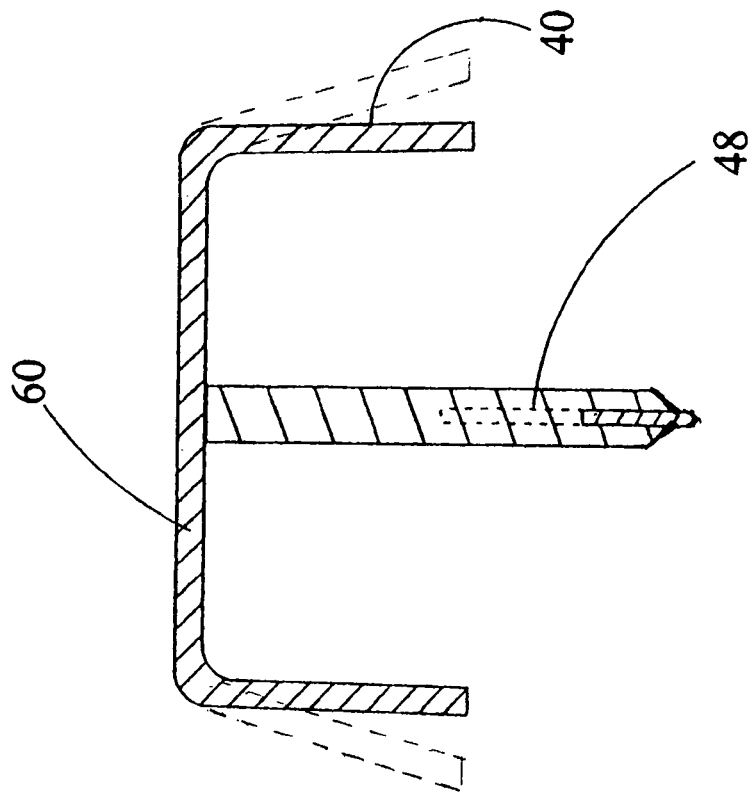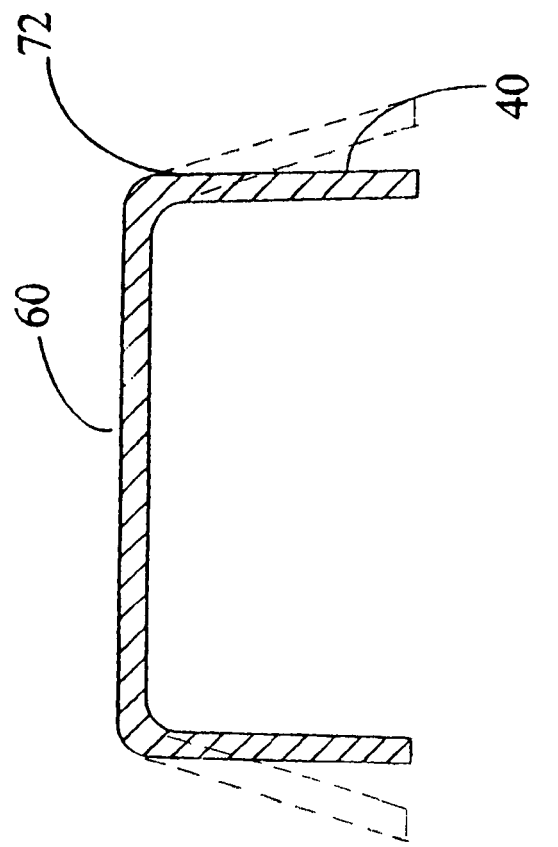
FIG.6
FIG.5

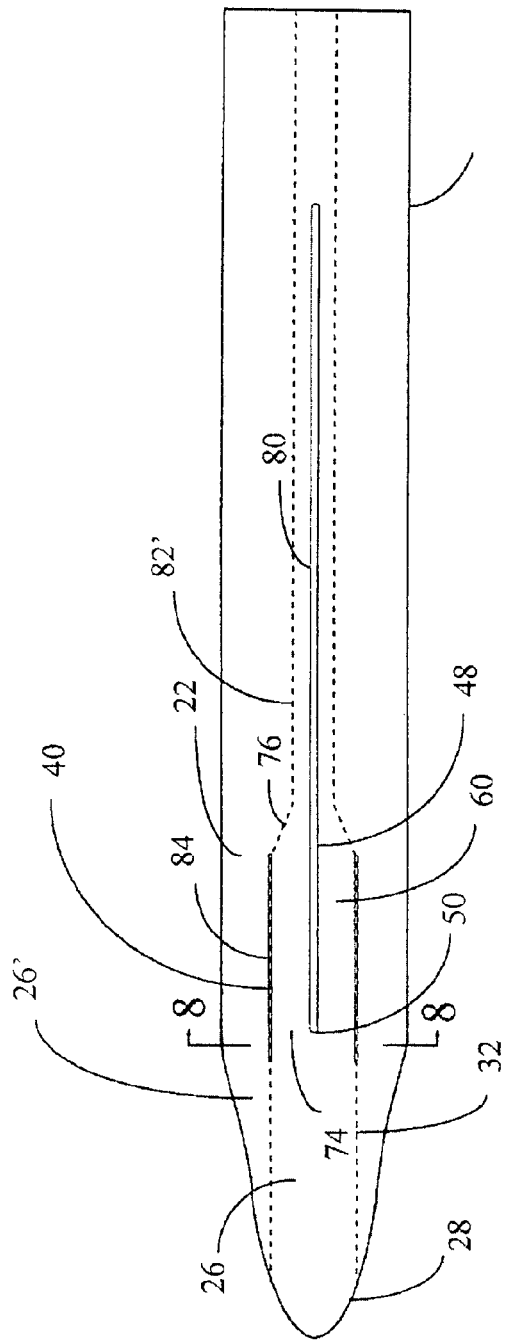
FIG.7
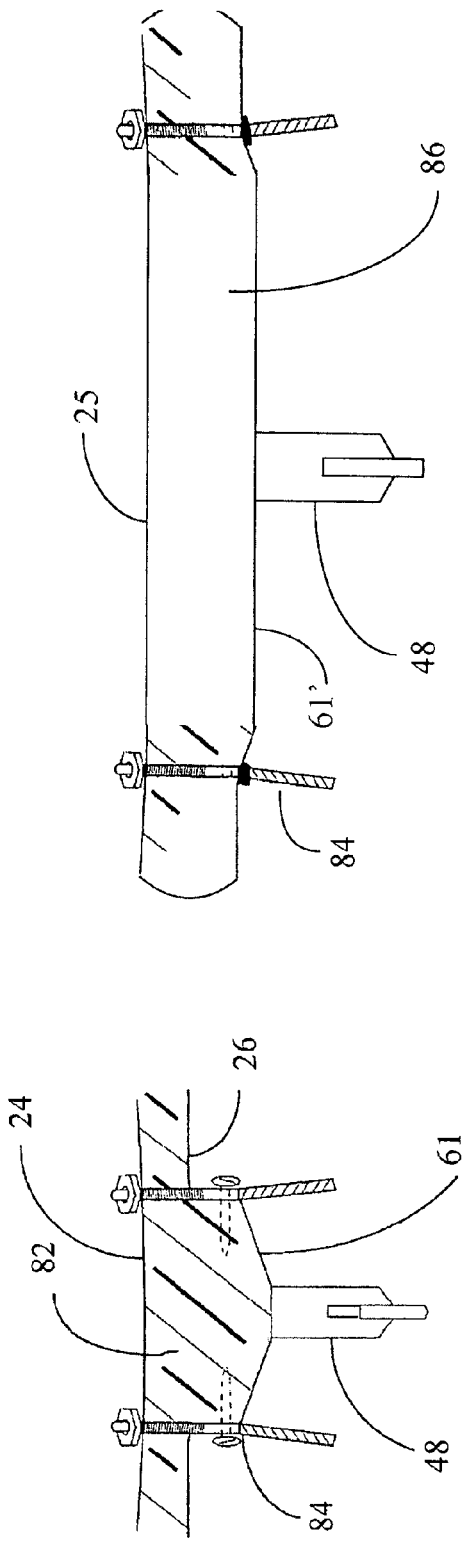
FIG.8A
FIG.8B

US 7,404,565 B2

ANTI-ZIGZAG GUIDE RAIL FOR SNOWMOBILE SKI

FIELD OF THE INVENTION

The present invention relates to the control of the skis of snow vehicle, particularly to devices which control the traction of skis of a snow vehicle on soft ice.

DESCRIPTION OF THE PRIOR ART

The present invention refers to four preceding inventions of the same author:

- initially CA2300359 concerns a stabilizer in a reversed U-shape superimposed with an existing runner, the wings of the U being cutting while the web thereof is covered with a slipping product;
- CA2442304 concerns an aggressive product whose wings become aggressive repeatedly at the contact of several openings over its length;
- CA2388833 concerns a rectangular, thin runner which is laid out sideways and which is self-sharpening.
- Finally CA2378638 concerns a reversed U-shape with a welded central runner.

The above products produce a safe performance under normal conditions of hard snow and ice, and several models are used, but what remains a problem is a passage over soft snow, producing a floating and an induced skidding.

OBJECTIVES AND ADVANTAGES

There is a need on the market for an anti-zigzag guide which is adaptable to various models of skis of snow vehicle, which is simple of construction, broad enough to bear on soft snow, short enough to slip without need of a slipping plastic and which can introduce and guide a self-sharpening runner of a certain depth and get an adherence without floating on soft snow at the time of fast turns. Moreover since the advent of the self-sharpening runner which maintains, by itself, a furrow without needing to be accompanied by a stabilizer of a reversed U-shape, along the runner and past the runner, there has been a need for a simple guide which, when placed at the front, causes the engagement of the self-sharpening runner. This applies especially in soft snow, as one can find in several areas. A more precise objective becomes to provide a guide fixed at the front of the ski and which includes two wings in a reversed U-shape whose web is tied to the lower face of a ski, combined with the initialization of a particularly rectangular runner which is laid out on the side, in continuation and in line with the guide.

BRIEF DESCRIPTION OF THE DRAWINGS

FIG. 5 is a cut according to line 5-5 of FIG. 3
FIG. 6 is a cut according to line 6-6 of FIG. 3
FIG. 7 is a draft of a ski with an inserted guide.
FIGS. 8A, 8B are from a cut according to line 8-8 of FIG. 7

DETAILED DESCRIPTION OF PREFERRED EMBODIMENTS

In the following description and in the accompanying drawings, the numeral numbers refer to identical parts in the various Figures.

Figure 1:
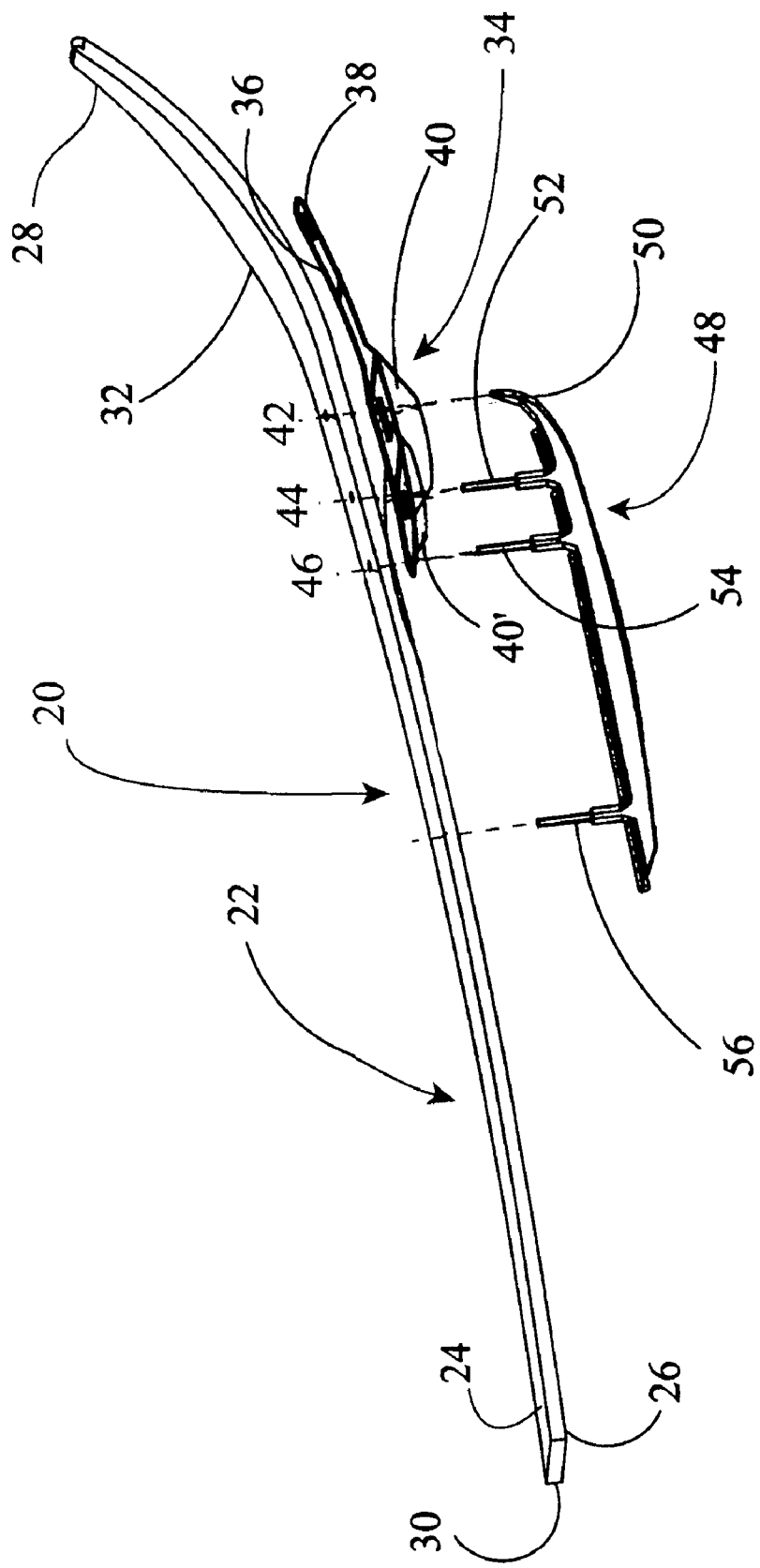
FIG. 1 is a perspective of a guide installed under a ski

FIG. 1 shows an armed ski 20 including a ski of a snow vehicle 22 having a top face 24, a ski bottom face 26, a front part 28, and a back part 30. Installed close to a curve 32 of the front part and under the bottom face appears a guide 34 equipped with a curved lip 36 attached to the front part of the ski by a front fastener 38. There is seen a pair of cutting wings 40, 40' and front support holes 42, central support 44 and a notch 46. Lower still appears a runner 48 having a runner front point 50 directed along a dotted line towards the front support hole 42, a first screw 52 directed towards the central support 44 and a second screw 54 directed towards the notch 46. Finally, a third screw 56 is directed towards the ski bottom face 26 of the ski of the snow vehicle.

Figure 2:
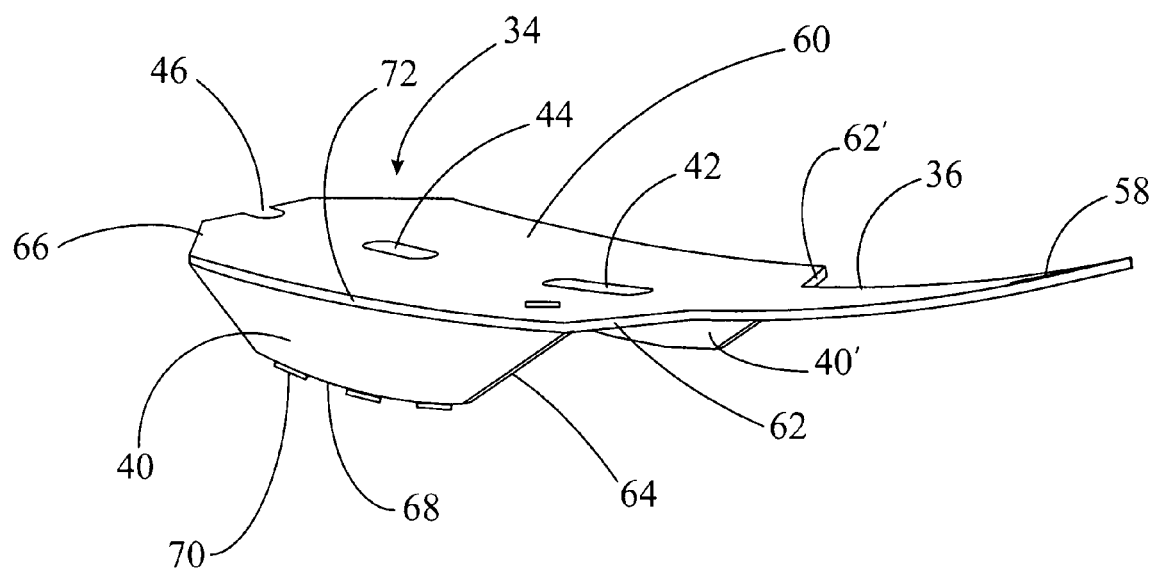
FIG. 2 is a perspective of the guide alone.

FIG. 2 shows the guide 34. The curved lip 36 has a fastener hole 58 which may be a strap. The guide 34 has a guide web 60 which forms with two wings 40 a reversed U-shape section. The front part of the web is joined to the curved lip by two widenings 62, 62' to minimize friction and to facilitate the entry of snow. The wings also have an angle of attack 64 located at the front. The extent of the web allows a certain floating only limited by the bottom surface and by the wings. At the back, the purpose of a tail angle 66 is to facilitate the exit of snow. The wings have a low limit 68 under which are inserted carbides 70 to give more wear resistance to the wings. Between the web and the wings there is a folding curve 72 which also has the advantage of attenuating the movement of the guide on snow.

Figure 3A:
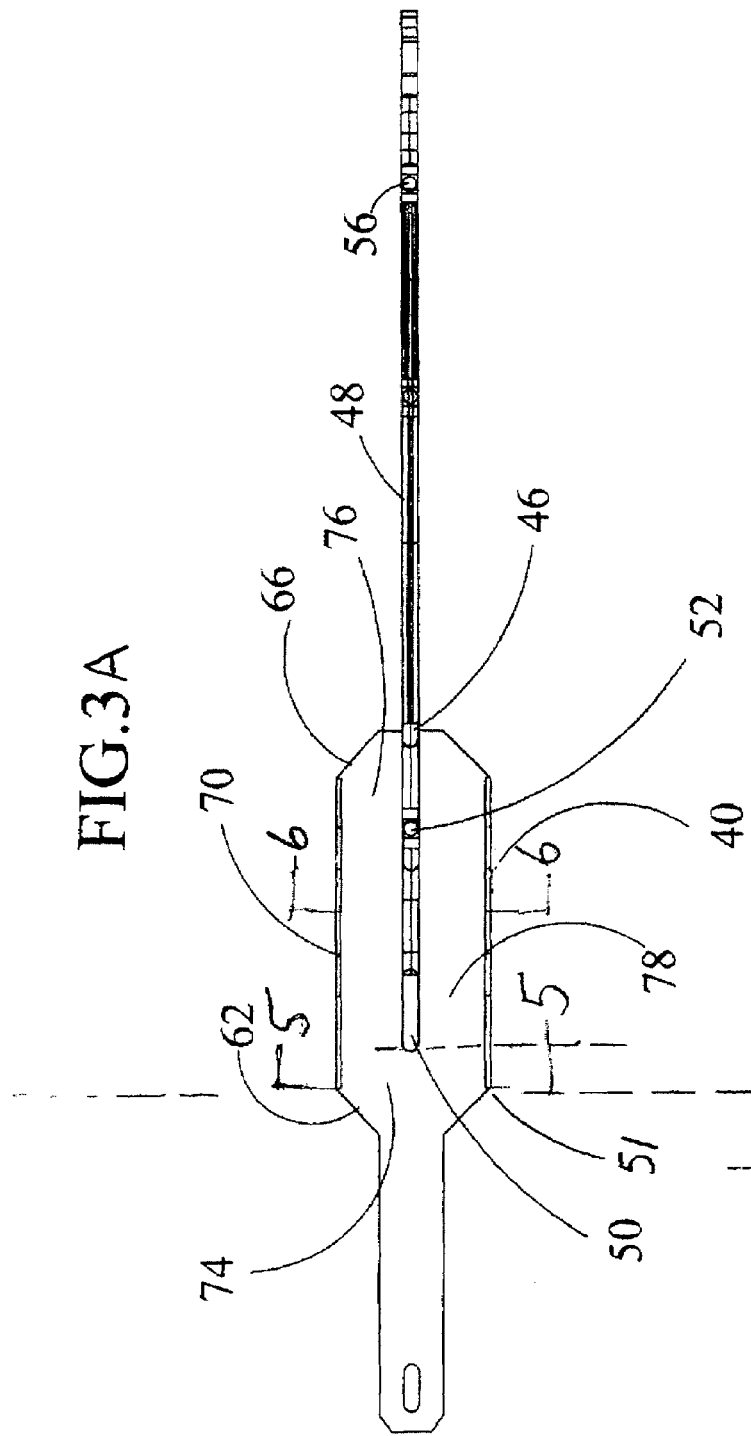
FIGS. 3A, 3B show the lower part of the guide with runner.

FIG. 3A shows an inlet channel 74 of snow, a pair of outlet channels 76 and a smooth surface 78 for the passage of snow. On the sides, are seen the wings 40. Inlet channels start between the runner front 50 and the wing front 51. In FIG. 3A, the longitudinal distance between the wing front 51 and the runner front 50 is shown by the dotted lines. In a typical embodiment it may be +2" toward the right and it may be +5".

Figure 3B:
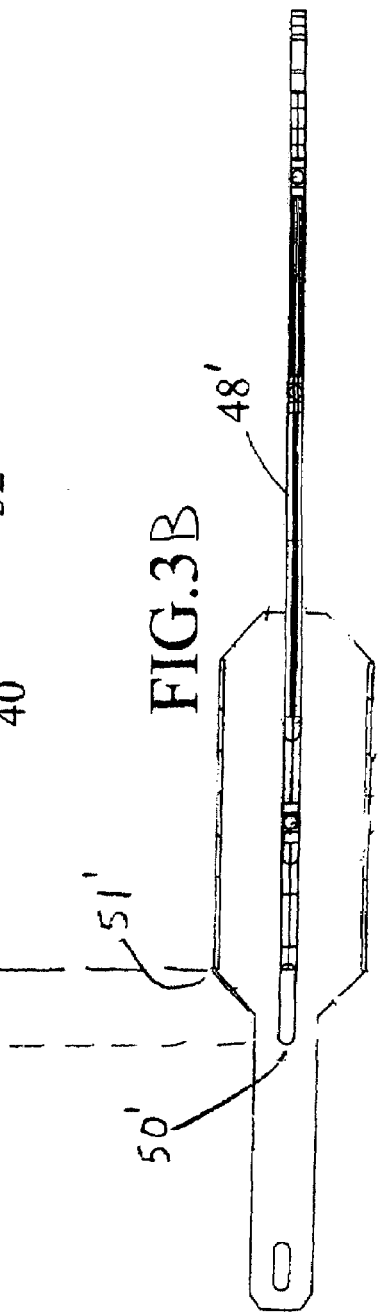

FIG. 3B shows a new position with respect to the runner front 50'. A typical distance may be of the order of −1". Other distances may be used such as −4" with the risk of increasing zig-zaging.

Figure 4:
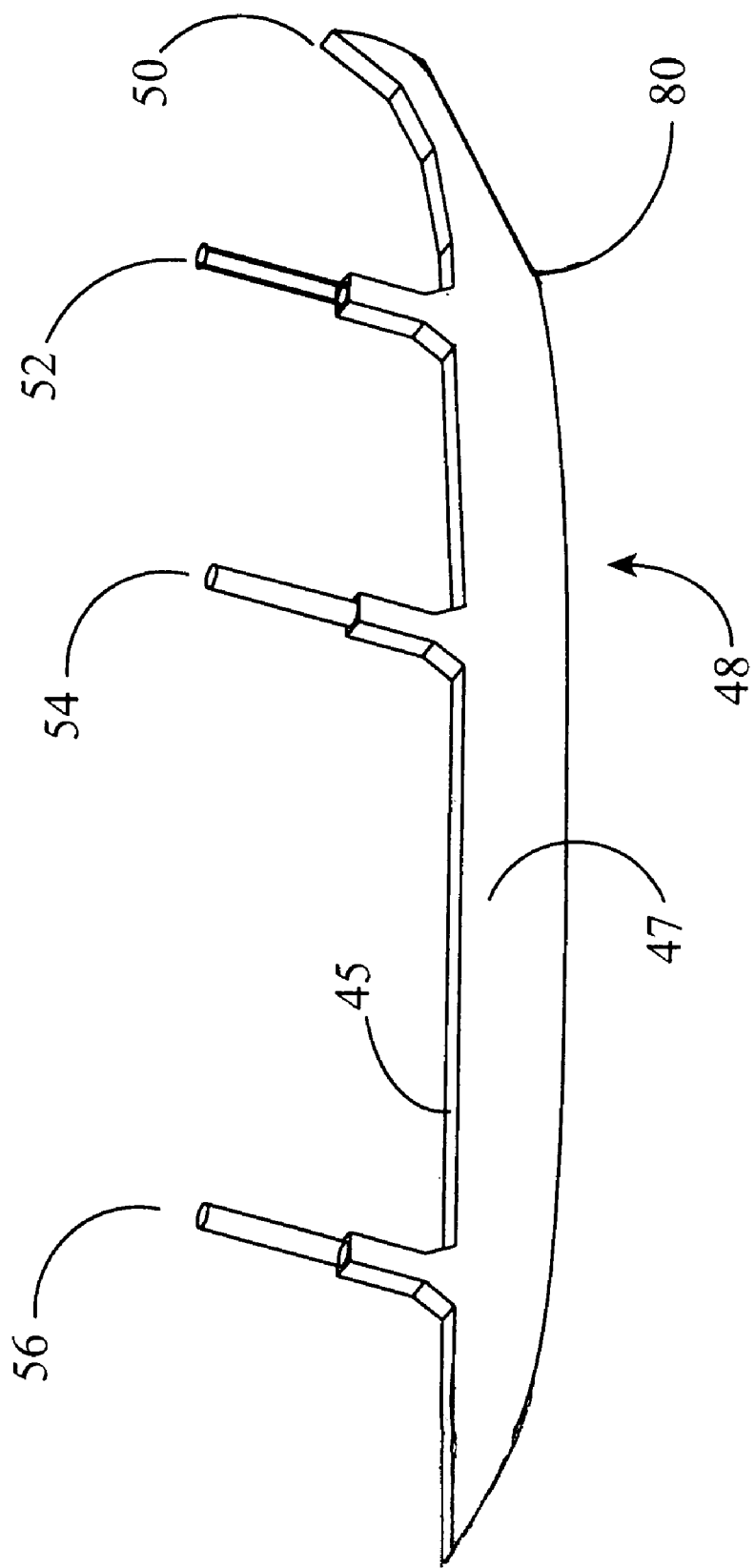
FIG. 4 is a perspective of the runner alone.

FIG. 4 shows a typical runner 48, with smaller side 45 and higher side 47. The runner seems rectangular and appears to be positioned sideways 80, the thin smaller side touching a snowy ground. This type of positioning allows it to be self-sharpening as it wears. One notices a runner front point 50 and screws 52, 54, 56 for adaptation to the ski.

FIG. 5 shows in section the guide web 60, wings 40, a folding curve 72, below which the wings are angled anywhere from 0 to 30 degrees.

FIG. 6 shows the addition of runner 48 in a cut section.

FIG. 7 shows in a draft a ski of snow vehicle 22, one seeing the bottom face 26 thereof and an entrance inlet channel 74 at the fore end of the ski, the passage between a knife guide 84 and the sideways runner 80 guides snow towards the outlet channel 76.

FIG. 8A shows a structural bulge 82 and knife guides 84.

FIG. 8B shows on another ski top 25 a conventional ski wall 86 suitable for the insertion of knife guides 84.

Application

It is about a guide one puts ahead of a ski of a snow vehicle and used in combination with a runner, particularly of the self-sharpening type for preventing or considerably decreasing zigzag. The combination of the short guide and the runner with carbide prevents floating. My tests showed that by using a small reversed U added to a runner with carbide produces an adherence of double magnitude in soft snow. The fact that the guide is short does not permit snow to stick. The runner used must be thin, long and high, the height of wing 40 being from 40 to 85% of the height of the runner 48.

A steel plate with a curved lip 36 and being well fixed by a fastener 58, gave good results for intimately joining the front of the ski even in the absence of Teflon$^{MC}$.

Installation

The guide is simple of installation and can be installed on almost any type of ski. It is thus universal and it is installed on all models of ski. It is an advantage for the dealer. The cost of the stabilization of the ski is thus reduced. The use in combination of the guide and the runner is advantageous in the snow-covered paths and soft snow. Without that guide the skis tend to zigzag. The guide with its two blades crushes snow and the two blades dig approximately ¾" inch and make their way through the trails of the snow vehicles that have preceded, to prevent zigzag.

The guide leads the runner like a tractor leads a trailer with the difference that the runner is aligned with the guide, like an engine with respect to train coaches.

SUMMARY OF THE INVENTION

A guide 34 to fix at the front of a ski of a snow vehicle, the guide defining a short section in reversed U-shape, comprising a web 60 including means for fixing to the bottom face of a ski and two cutting wings disposed in direction of the ground and longitudinally of the ski, the guide comprising means for initialization of a runner 48 in continuation and in line with the guide when longitudinally placed. The means for fixing include a curved lip 36 which is positioned in continuation in front of the web and comprising a front fastener 38 to fix to the front part, the web comprising at least two support holes 42, 44 intended to fix the runner to the guide and to the ski. The support holes include a notch 46 which is perfected in the rear part of the web. The means for initialization may include the positioning of front part of the runner in retraction of an entrance channel 74 of the guide. The runner is preferably rectangular and positioned against its short side. The rectangular section of the runner has a long side of depth in preference from −60% to +120% longer than the depth of the cutting wing 40 of the guide 34. Other types of runners may be used but with less usefulness.

The invention may be carried out in a ski to which are added either the guide 34 or two wings 40 spread over the bottom face of the ski, the bottom face acting as a sliding web for the guide.

A ski of snow vehicle used in combination with a wear runner 48 which is laid out longitudinally of the ski, the ski including in its fore end a fixed guide, the guide defining a short reversed U-shape section having a web 60 and means thereof for fixing to the bottom face of the ski, and two wings 40 protruding from the web, in direction of the ground and longitudinally of the ski, the guide comprising means for initialization of a runner in continuation and in line with the guide when placed longitudinally of the ski.

A snow vehicle ski may be used in combination with a wear runner, the ski having a bottom face 26 comprising a structural bulge 82, the bulge comprising a pair of knives 84 spaced to guide snow along the wear runner vertical sides.

A guide fixed at the front part of a ski of a snow vehicle and comprising two wings defining a reversed U-shape the web thereof being the lower face of the ski, the guide comprising means for initialization of a rectangular runner which is disposed on the its smaller side, in continuation and in line with the guide.

The means for initialization is a length of wing preferably of approximately a third the length of the runner and being variable from 10 to 50%. In the patent CA2442304 snow is directed along the two sides, while moving away from the rectangular runner, immediately after the opening, whereas here the wings, starting from the wing front 51 are used to guide the ski through trail obstacles following which snow continues along the runner and passed the runner tail 49. The guide in front of the runner behaves similarly to a truck whose tractor takes a route and makes possible to the trailer to follow the traced way.

A ski of snow vehicle used in combination with a wear runner which is laid out longitudinally of the ski, the ski comprising in its fore end a pair of knives spaced to guide the snow on the two sides of the wear runner. A typical section for such a ski appears in FIG. 8.

A guide 34 to fix at the front 28 of a ski of a snow vehicle 22 the guide defining a short section in reversed U or L-shape comprising a web 60 comprising means for fixing to a bottom face 26 of the ski and at least one wing 40 protruding from the web in direction of the ground and longitudinally of the ski, the short section being in combination with a central runner 48 and the guide being characterized by, when seen sideways, wings covering part of the runner starting from the beginning of the runner front 50 up to 50% of its total length.

A ski for a snow vehicle 22 comprising a structural bulge 82 in the bottom face 26 of its front part 28, one a knife guide 84 fixed on a side or the other of the bulge at the front, the bulge in combination with one or two of the knife guides 84 defining a short section in reversed L or U-shape cross section, whose bulge forms a ski web 61 and the knives are in lieu of wings 40, the short section being used in combination with a wear runner 48 which is laid out centrally of the reversed U or L-shape section and longitudinally of the ski, the short section being characterized by, when seen sideways, the wings covering the fore end of the runner up to 50% of its overall length, the knives and the wear runner 48 comprising means for fixing to the bottom face 26 of the ski.

A ski of snow vehicle used in combination with a wear runner 48, the ski comprising a top face 24, a sliding bottom face 26, a front part 28, a back part 30, a curve 32 which is laid out close to the front part, the bottom face comprising a wear runner 48 between a pair of knives 84 being characterized by, when seen sideways, covering the beginning of the runner up to 50% its overall length, and spaced to guide the snow on the two sides of a channel 74 between the knives 84 and the wear runner.

A ski of snow vehicle comprising a structural bulge 82 in a bottom face 26 of its front part 28 and at least one knife guide 84 fixed on a side or other of the bulge, the bulge in combination with one or two of knives 84 defining a short section, in reversed U or L-shape, whose space between the wings forms a guide web 60, the short section being used in combination with in a wear runner 48 which is laid out along the longitudinal center of the reverse L or U-shape section and longitudinally of the ski, knife-guides 84 being parallel to the ski, a U section comprising a web 60 and wings 40, the web 60 comprising means for fixing to the bottom face 26 of the ski and wings 40 protruding from the web at approximately 90 degrees downwards in direction of the ground, the distance between the wing front 51 and the runner front 50, when seen from left to the right being preferably of −1 inch to +3 inches and even −3 to +5 inches, a positive distance defining an entry funnel of snow between the wings before touching the runner and deviating from it.

Other objects and fields of application of this invention will be released from this description, as a person familiar with the art will take note of the various aspects of the invention.

Present descriptions, however detailed, are only preferred applications of the present invention and are given only by way of illustration.

It is understood that any clever and experienced person in the field will be able to bring various changes and adaptations, without carrying the application out of the range of this invention.

It is clearly understood that the mode of realization of this invention which was described above, in reference to the annexed drawings, was given as an indication and are by no means restrictive, and modifications and adaptations thereof can be brought without departing from the object or of the framework of this invention.

| LÉGENDE | |
|---|---|
| 20 | Armed ski |
| 22 | Snow vehicle ski |
| 24 | Top face |
| 25 | Other ski top |
| 28 | Front Part |
| 30 | Back part |
| 32 | Curve |
| 34 | Guide |
| 36 | Curved lip |
| 38 | Front fastener |
| 40 | Cutting wing |
| 42 | Front support |
| 4 | Central support |
| 45 | Smaller Side |
| 46 | Notch |
| 48 | Runner |
| 49 | Runner tail |
| 50 | Runner front |
| 52 | First screw |
| 54 | Second screw |
| 64 | Angle of attack |
| 66 | Angle of tail |
| 68 | Low limit |
| 70 | Carbides |
| 72 | Folding curve |
| 74 | Inlet channel |
| 76 | Outlet channel |
| 78 | Surface smoothes |
| 80 | Runner on sideways |
| 82 | Structural bulge |
| 84 | Knife guide |
| 47 | Higher Side |
| 51 | Wing front |
| 61 | Ski web |
| 26 | Bottom face |
| 86 | Conventional ski wall |

I claim:

1. A guide (34) to fix at the front (28) of a ski of a snow vehicle (22), said guide defining a short section in reversed U-shape comprising a web (60) and two cutting wings (40) protruding from said web to a certain depth in direction of the ground and longitudinally of said ski, said web comprising means for fixing to a lower face (26) of said ski, said guide being employed in combination with a wear runner (48) located under said web and parallel to said wings, said guide being characterized by, when seen sideways, one of its wings covering part of said runner up to 50% of its total length.

2. The guide of claim 1 wherein said cutting wing has a wing front (51) distanced to a runner front (50) by −1 inch to +3 inches when seen from left to right, a positive distance defining an entry of snow between said wings before touching said runner and deviating from it.

3. The guide of claim 1 wherein said means for fixing comprise a curved lip (36) which is laid out in continuation with a front part (28) of a ski and comprise a front fastener (38) fixing said guide to said front part, said web of said guide comprising at least two holes (42) intended to fix said runner to said guide and to said ski.

4. The guide of claim 3 comprising a notch (46) which is positioned at the back of said web.

5. The guide of claim 1 wherein said runner comprises a runner front positioned in retraction compared to a wing (51).

6. The guide of claim 1 wherein said runner (48) has a rectangular section defining a smaller side (45) and a higher side (47), said runner being positioned on said smaller side, said longer side corresponding to the depth of said runner −60% to +120% longer than said certain depth of said cutting wing (40) of the guide.

7. The guide of claim 6 wherein said cutting wing which is protruding from said web is oriented openly from perpendicular to 30 degrees from said web to permit passage of rocks.

8. A guide (34 FIG. 1) to be fixed to the front (28) of a ski of snow vehicle (22) in combination with a runner which is positioned longitudinally, said guide defining a short section in reversed U or L-shape and comprises a web (60) with means for fixing to a bottom face (26) of said ski and at least one wing (40) protruding from said web, in direction to the ground longitudinally of said ski, said guide being characterized by, when seen sideways, the wing covering part of said runner (48) starting from the beginning of said runner front (50) up to 50% of its overall length.

9. A ski of a snow vehicle (22) having a sliding bottom face (26) of its front part (28); and at least one knife guide (84) fixed on one side or the other of said bottom face (26) of said ski to define a short section in reversed L or U-shape, said short section being used in combination with a wear runner (48) which is laid out centrally of said reversed U or L-shape and longitudinally of said ski, said short section being characterized by, when seen sideways, said knife guide (84) partially hiding said runner up to 50% of its overall length, said knife (84) and said wear runner (48) comprising means for being fixed to said bottom face (26) of said ski.

10. The ski of snow vehicle (22) of claim 9 wherein said bottom face (26) comprises a structural bulge (82) that has a width of at least the distance between said knife, said bulge being located in a position within said front part (28) of said ski.

11. The ski of snow vehicle (22) of claim 9 used in combination with only one knife guide (84) and with a runner having a curved runner front (50) spread to facilitate the passage of rocks between said runner and said knife.

12. The ski of snow vehicle (22) of claim 9 wherein said short section is in reversed U-shape and wherein said runner (48) has a runner front (50), the distance between a fore end of one the wings and said runner front (50), when seen from left to right being of −3 inch to +5 inches, a positive distance defining an entry of snow between said wings before touching said runner and deviating therefrom.

* * * * *